United States Patent [19]

Fischer

[11] 4,187,045

[45] Feb. 5, 1980

[54] DRILLING ASSEMBLY AND A DRILLING TOOL THEREOF

[76] Inventor: Artur Fischer, Weinhalde 34, 7244 Waldachtal 3, Tumlingen, Fed. Rep. of Germany

[21] Appl. No.: 965,299

[22] Filed: Nov. 22, 1978

[30] Foreign Application Priority Data

Dec. 7, 1977 [DE] Fed. Rep. of Germany ....... 2754383

[51] Int. Cl.² .................. B23B 31/12; B23B 51/02
[52] U.S. Cl. .................. 408/240; 279/1 S; 279/62; 408/226; 408/230
[58] Field of Search .......... 408/226, 239, 239 A, 408/230, 240; 90/11 A; 279/1 S, 1 ME, 9, 46–54, 60–64

[56] References Cited

U.S. PATENT DOCUMENTS

| 369,248 | 8/1887 | Johnson | 408/226 |
| 2,189,068 | 2/1940 | Hubbell | 279/62 |
| 2,468,874 | 5/1949 | Hawkins | 408/226 |
| 3,982,846 | 9/1976 | Steinbach | 408/226 |

Primary Examiner—Z. R. Bilinsky
Attorney, Agent, or Firm—Michael J. Striker

[57] ABSTRACT

A drilling assembly has a drilling tool which is insertable into a collet chuck of a drilling machine and includes an elongated shaft clamped by the collet chuck, and a longitudinally extending portion on the shaft engageable in a slot between two collets of the collet chuck. The longitudinal portion prevents displacement of the drilling tool relative to the chuck in a circumferential direction. A transversely extending portion is further provided on the shaft so as to abut against an end face of the collet chuck when the drilling tool is clamped therein. These portions may be of one piece with one another and may be manufactured by a stamping process.

6 Claims, 2 Drawing Figures

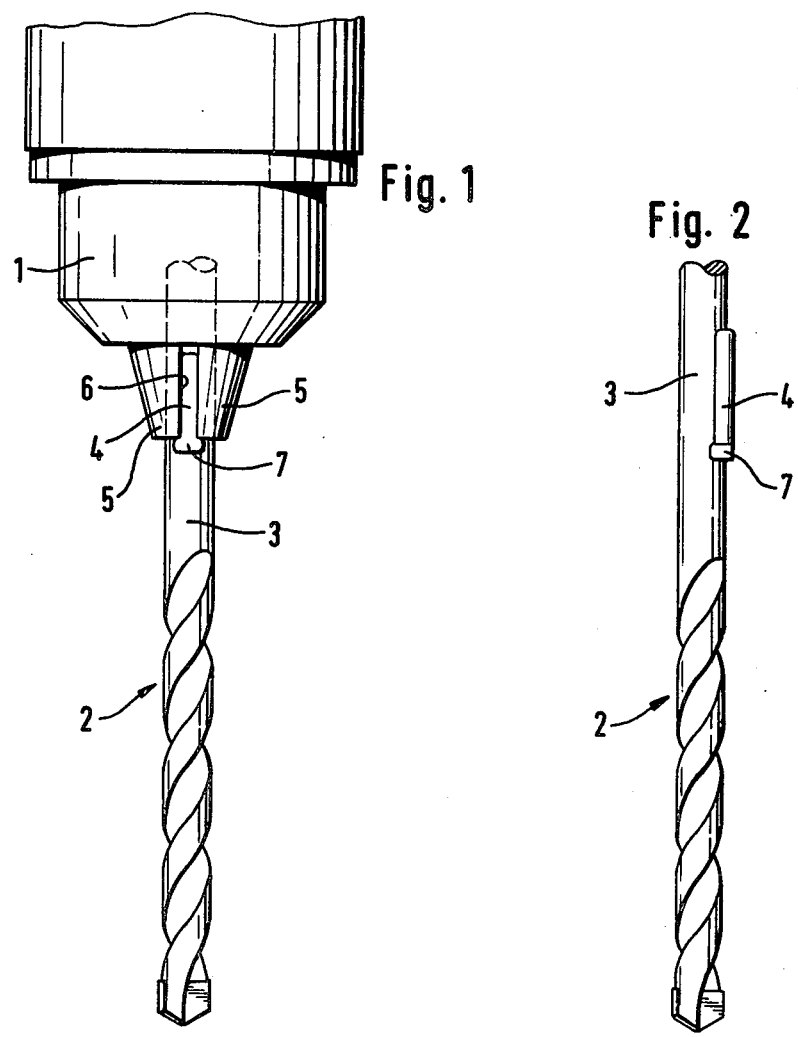

DRILLING ASSEMBLY AND A DRILLING TOOL THEREOF

BACKGROUND OF THE INVENTION

The present invention relates to a drilling tool. More particularly, it relates to a drilling tool which is clamped in a jaw chuck of a drilling machine. It also relates to a drilling assembly including such a drilling tool.

Drilling machines such as hand-held percussion drills are utilized for making holes in cement or masonry, into which holes dowels are to be inserted. In such machines small drilling tools are clamped in jaw chucks. It has been recognized that when the holes are drilled in hard materials, the above-mentioned clamping is not sufficient to transmit the impact and rotation from the jaw chuck to the drilling tool. This results in rotation of the chuck relative to the drilling tool, which not only hinders the manufacture of the dowel holes, but also causes damage to the shaft of the drilling tool due to formation of grooves.

SUMMARY OF THE INVENTION

Accordingly, it is an object of the present invention to provide a drilling tool which avoids the disadvantages of the prior art.

More particularly, it is an object of the present invention to provide a drilling tool which is so constructed that it cannot rotate relative to the chuck during the manufacture of holes.

In keeping with these objects and with others which will become apparent hereinafter, one feature of the present invention resides, briefly stated, in a drilling tool which has an elongated shaft to be clamped in a jaw chuck, and a transversely projecting portion which is provided on the shaft and engages in one of the slots defined between adjacent jaws of the jaw chuck.

Usually, in order to assure centered clamping of the drilling tools of different sizes, the jaw chuck has three separate jaws which are adjusted by a clamping nut. The projecting portion provided on the shaft of the inventive drilling tool is so arranged that it engages in the slot between two of the jaws of the jaw chuck. Direct force transmission is attained in this construction by clamping, on the one hand, and by interengagement of the projecting portion of the shaft and the slot of the jaw chuck, on the other hand. A relative rotation of the drilling tool and the jaw chuck is thereby prevented.

The projecting portion projects from the outer surface of the shaft in a radial direction, extends in the direction of elongation of the shaft, and is of one piece with the latter. Lateral faces of the projecting portion may abut against faces of the jaws which bound the above-mentioned slot. The drilling assembly in accordance with the present invention includes the drilling tool having the above-described construction.

Another feature of the present invention is that an abutment portion may be provided on the shaft of the drilling tool so as to abut against an end face of the jaw chuck. When the drilling tools are small, their lengths may be such that the tool does not abut against a base of the jaw chuck. In such a construction during manufacture of the holes the drilling tools are frequently displaced rearwardly, especially when the drilling tools are utilized in percussive drills. The abutment portion which abuts against the end face of the jaw chuck prevents the rearward displacement of the drilling tool relative to the chuck. The abutment portion extends in the direction transverse to the direction of elongation of the shaft of the drilling tool, and is of one piece with the latter.

In accordance with a further feature of the present invention, the abutment portion is located at a leading end of the projecting portion, the end facing toward a tip of the drilling tool. These portions may be of one piece with one another. In such a construction the projecting portion and the abutment portion can be manufactured in a very simple manner by one working step of a stamping process.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a drilling tool which is clamped in a jaw chuck; and

FIG. 2 is the drilling tool shown in FIG. 1, which is turned by 90°.

DESCRIPTION OF THE PREFERRED EMBODIMENTS

A drilling tool assembly and a drilling tool thereof in accordance with the present invention is shown in FIG. 1. The drilling tool is identified by reference numeral 2 and has a shaft portion 3 which is at least partially inserted into a jaw chuck 1 to be clamped therein. The jaw chuck 1 has jaws 5 which bound slots 6 therebetween.

A projecting portion 4 is provided on an outer surface of the shaft 3 of the drilling tool 2. The projecting portion 4 is elongated and extends in the direction of elongation of the shaft 3. Preferably, it projects radially from the outer surface of the shaft 3 and is of one piece with the latter. The projecting portion 4 can be manufactured, for example by a stamping process.

When the drilling tool 2 is received in the jaw chuck 1, the projecting portion 4 engages in the slot 6 between two adjacent collets 5. The projecting portion 4 may be so constructed that its lateral faces in inserted condition abut against the lateral faces of the collars bounding the slot 6, as considered in the circumferential direction. The abutment of the projecting portion 4 of shaft 3 against the lateral faces of the collars 5 bounding the slot 6 forms a further force transmitting connection, in addition to the connection which is formed by clamping of the shaft 3 in the jaw chuck 1.

An abutment portion which is identified by reference numeral 7 is further provided. This portion extends in a direction which is transverse to the direction of elongation of the shaft 3 and abuts against the end face of the jaw chuck 1. The portion 7 is of one piece with the shaft 3. In accordance with a preferable embodiment of the present invention, the abutment portion 7 is arranged at a leading end of the projecting portion 4 and is of one piece with the latter.

The abutment portion 7 may extend laterally beyond one side of the projecting portion 4. On the other hand, the abutment portion 7 may extend laterally beyond both sides of the projecting portion 4, as shown particularly in FIG. 1. The abutment portion 7 may be manufactured by a tangentially located stamping die. The abutment portion 7 forms a stop which prevents axial rearward displacements of the drilling tool under the action of great axial forces.

It is to be understood that two or more such projecting portions with two or more such abutment portions may also be provided on the shaft.

It will be understood that each of the elements described above, or two or more together, may also find a useful application in other types of constructions differing from the types described above.

While the invention has been illustrated and described as embodied in a drilling tool, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drilling tool to be clamped in a jaw chuck of a drilling machine, which chuck has at least two jaws bounding slots therebetween and each having an end face and two lateral faces, the drilling tool comprising an elongated shaft having an axis, a circumferential surface, a trailing end portion arranged to be inserted into the jaw chuck, and a leading end portion axially spaced from said trailing end portion and having a tip; an elongated projecting portion projecting from said circumferential surface of said shaft in a radial direction and extending in an axial direction of the same, said projecting portion having a leading end facing toward said tip of said shaft; and an elongated abutment portion at said leading end of said projecting portion and also projecting from said circumferential surface of said shaft in the radial direction but extending in a direction which is transverse to said axis of said shaft and to said projecting portion laterally outwardly beyond the latter, so that said projecting portion engages in one of the slots between the chuck jaws with lateral abutment against the lateral faces of the latter so as to prevent relative rotation of said shaft and the chuck, whereas said abutment portion abuts against the end faces of the chuck jaws so as to prevent axial rearward displacement of said shaft relative to the chuck.

2. A drilling tool as defined in claim 1, wherein said projecting portion and said abutment portion together form a one-piece T-shaped member which is of one piece with said shaft.

3. A drilling tool as defined in claim 1, wherein said projecting portion has a leading section adjacent to said leading end, and a remainder section, said abutment portion being arranged only on said leading section of said projecting portion, whereas said remainder section of said projecting portion is free of said abutment portion.

4. A drilling tool as defined in claim 1, wherein said projecting portion has two side faces spaced from one another in said transverse direction, said abutment portion extending laterally beyond both side faces of said projecting portion.

5. A drilling tool as defined in claim 1 wherein said shaft has a uniform thickness.

6. A drilling assembly for a drilling machine, comprising a jaw chuck having at least two jaws bonding slots therebetween and each having an end face and two lateral faces; and a drilling tool having an elongated shaft which has an axis, a circumferential surface, a trailing end portion arranged to be inserted into the jaw chuck, and a leading end portion axially spaced from said trailing end portion and having a tip, said drilling tool having an elongated projecting portion projecting from said circumferential surface of said shaft in a radial direction and extending in an axial direction of the same, said projecting portion having a leading end facing toward said tip of said shaft, said drilling tool also having an elongated abutment portion at said leading end of said projecting portion and also projecting from said circumferential surfaces of said shaft in said radial direction but extending in a direction which is transverse to said axis of said shaft and to said projecting portion laterally outwardly beyond the latter, so that said projecting portion engages in one of said slots between said chuck jaws with lateral abutment against the lateral faces of the latter so as to prevent relative rotation of said shaft and said chuck, whereas said abutment portion abuts against said end faces of said chuck jaws so as to prevent axial rearward displacement of said shaft relative to said chuck.

* * * * *